April 23, 1968          H. KORSHAK          3,379,073
WELDED GEAR AND CAM ASSEMBLY FOR POWER OPERATED
KNIVES AND OTHER TOOLS
Filed March 10, 1966          2 Sheets-Sheet 1
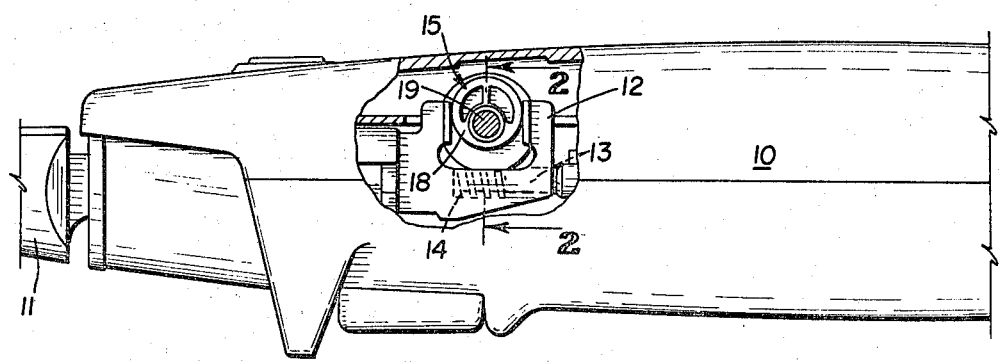
Fig. 1
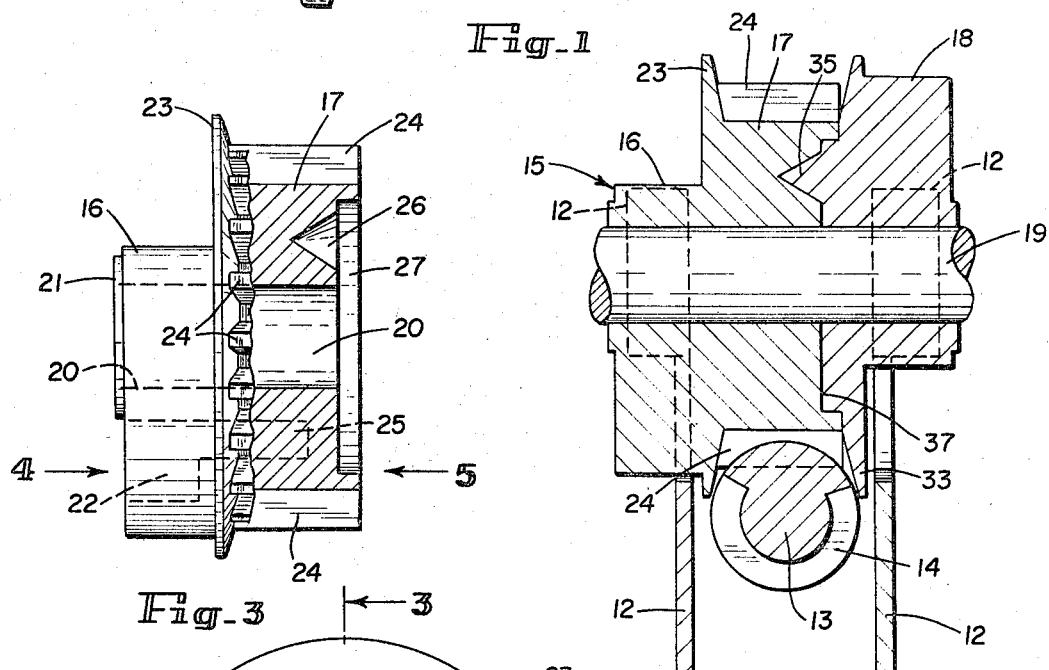
Fig. 3
Fig. 2
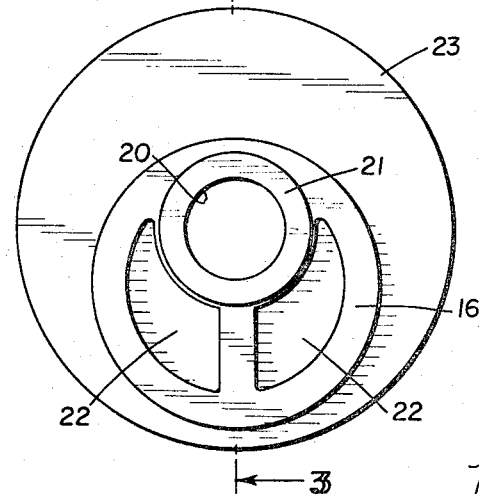
Fig. 4
INVENTOR.
HARVEY KORSHAK
BY
Bertha L. MacGregor
ATTORNEY

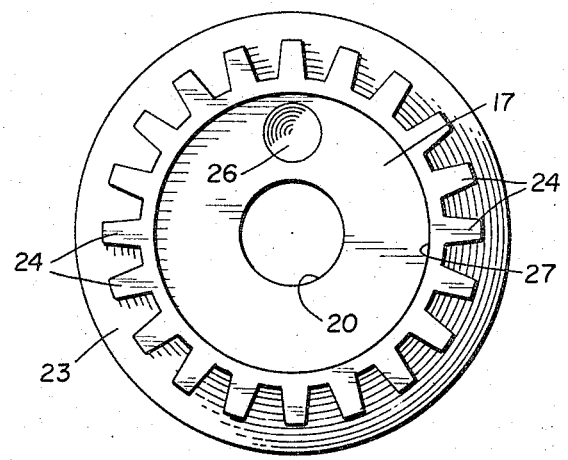
Fig_5
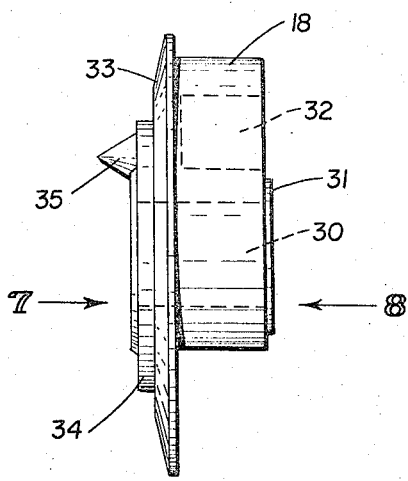
Fig_6
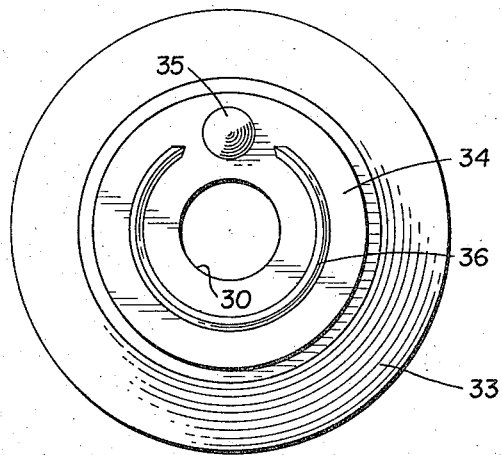
Fig_7
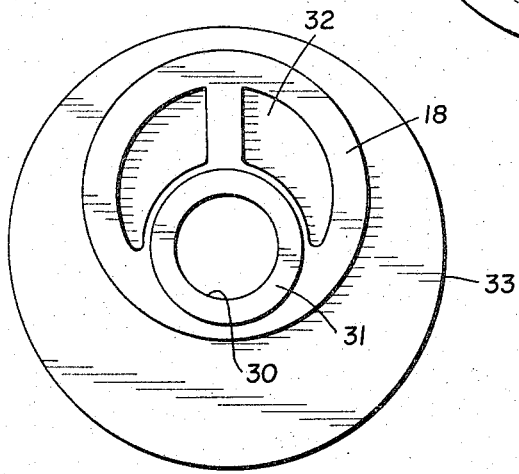
Fig_8
INVENTOR.
HARVEY KORSHAK
ATTORNEY United States Patent Office
3,379,073
Patented Apr. 23, 1968

3,379,073
WELDED GEAR AND CAM ASSEMBLY FOR POWER OPERATED KNIVES AND OTHER TOOLS
Harvey Korshak, Skokie, Ill., assignor to Scovill Manufacturing Company, Waterbury, Conn., a corporation of Connecticut
Filed Mar. 10, 1966, Ser. No. 533,355
6 Claims. (Cl. 74—434)

This invention relates to a welded gear and cam assembly for a power operated knife or other appliance. When embodied in a power operated knife, the gear and cam assembly functions to impart reciprocatory motion to the knife blades, but the invention may be embodied in other devices where reciprocatory motion is transmitted to mechanism.

The main object of the invention is to produce a gear and cam assembly which is efficient for its intended purposes and can be made at substantial savings in production costs. This advantage is achieved by making the gear and one of two cams integrally and by welding the other of the two cams to the gear, preferably by ultrasonic welding.

Another object of the invention is to form the gear and cam surfaces which are joined by welding in such manner that a strong bond is provided and the finished product has the qualities of an integrally formed gear and two cams assembly.

In the drawings:

FIG. 1 is an elevational side view of a power operated knife in which the housing has been broken away to expose the cam and gear assembly of this invention.

FIG. 2 is a transverse vertical sectional view, enlarged, in the plane of the line 2—2 of FIG. 1 showing the cam and gear assembly and parts of the knife blade drivers engaged by the cams.

FIG. 3 is a sectional view, partly in elevation, of the integral gear and cam, in the plane of the line 3—3 of FIG. 4.

FIG. 4 is an elevational view of the integral gear and cam as viewed from the left side of FIG. 3.

FIG. 5 is an elevational view of the integral gear and cam as viewed from the right side of FIG. 3.

FIG. 6 is an elevational view of the separately formed cam before it is welded to the gear.

FIG. 7 is an elevational view of the cam of FIG. 6 as viewed from the left side of that figure.

FIG. 8 is an elevational view of the cam of FIG. 6 as viewed from the right side of the figure.

In that embodiment of the invention shown in the drawings, a power operated knife housing is designated 10 and part of blades 11. The blades are operatively connected to drivers 12 which are engaged by the cams of the gear and cam assembly described herein. A motor shaft 13 has a worm 14 on its end for engagement with the gear of the assembly indicated as a whole at 15.

The gear and cam assembly comprises an integrally formed cam 16 and gear 17, as shown in FIGS. 3–5, and a separately formed cam 18, shown in FIGS. 6–8. When welded into the assembly 15, the gear and cams are mounted on a shaft 19 which extends transversely of the housing 10, in such position that the gear 17 is driven by the worm 14 on motor shaft 13.

Referring to FIGS. 3 and 4, the cam 16 is circular in form, provided with an eccentrically located shaft bearing bore 20 defined by a rim 21. Weight saving recesses are indicated at 22. The cam 16 has an integral inner side plate 23 on which the cam 16 is eccentrically located. The gear 17 is integral with the plate 23 and concentric therewith. Gear teeth 24 are designed to mesh with the worm gear 14. The recesses 22 of the cam 16 communicate with recesses 25 in the body of the gear 17 at one side of the shaft bore 20. At the other side of the shaft bore 20, the gear body is provided with a conical cavity 26 which extends inwardly from a shallow recess 27, circular in outline and concentric with the shaft bore 20 on the free side of the gear 17.

Referring to FIGS. 6–8, the separately produced cam 18 comprises parts some of which are similar in form to the cam portion of the integrally formed cam 16 and gear 17. The cam 18 is circular in form, provided with an eccentrically located shaft bearing bore 30, rim 31, and weight saving recesses 32. The cam 18 also has an integral side plate 33 on which the cam is eccentrically located.

The cam plate 33 has formed on its exposed side, as shown in FIGS. 6 and 7, a thickened area 34 complemental to the recess 27 in gear 17. A cone shaped projection 35 on the area 34 is complemental to the conical cavity 26 of the gear 17. An annular rib 36 projects from the thickened area 34 as shown in FIG. 7.

When the separate cam 18 is fitted against the side of the gear 17, as shown in FIG. 2, the cone shaped projection 35 fills the cavity 26, and the thickened area 34 fills the recess 27 in the gear 17, with the annular rib 36 contacting the floor of the recess 27. The proximate surfaces of the cam 18 and gear 17 are bonded together by ultrasonic welding 37 which produces a gear and two-cams assembly having the characteristics of an integrally produced unit. The cam 18 is located on the gear 17 in such position that the cams 16 and 18 are 180 degrees apart on opposite sides of the gear 17. Thus the cams 16, 18, in engagement with the drivers 12, 12, alternately move one driver forwardly and the other driver rearwardly to reciprocate the blades 11. Several surfaces on each of the two members which are designed for welding together are complemental to each other and cooperate with the welding of the gear 17 and cam 18 together into a unitary structure.

In describing the invention, reference has been made to a particular example embodying the same, but I wish it to be understood that the invention is not limited to the construction shown in the drawings and that various changes may be made in the construction and general arrangement of parts without departing from the invention defined by the appended claims.

I claim:

1. A welded gear and cam assembly for power operated knives and other tools comprising
   (a) an integrally formed gear and cam, the cam being eccentrically located on one side of the gear,
      (a-1) the gear having a shallow recess in its free side and a cavity communicating with the recess,
   (b) a separately formed cam having a protruding thickened area on one of its sides for seating in the recess in the gear and a projection extending outwardly from the thickened area complemental to the cavity in the gear, and
   (c) welding connecting the proximate sides of the gear and separately formed cam after the thickened area and projection on the separately formed cam have been inserted into the recess and cavity on the free side of the gear whereby the integrally formed gear and the separately formed cam become a unitary structure.

2. The gear and cam assembly defined by claim 1, in which the complemental projection and cavity are conical in form.

3. The gear and cam assembly defined by claim 1, in which the separately formed cam is mounted eccentrically on the gear and 180 degrees from the integrally formed cam on the gear.

4. A welded gear and cam assembly for power operated knives and other tools comprising
   (a) an integrally formed gear, radially projecting side plate concentric with the gear, and cam eccentrically located on the side plate, (b) a separately formed cam provided with an integral radially projecting side plate on which the cam is eccentrically located, (c) interfitting recesses on one of said gear and side plate of the separately formed cam and projections on the other of said gear and side plate of the separately formed cam, and (d) welding connecting the proximate sides of the gear and side plate of the separately formed cam after the projections have been inserted in the recesses, whereby the integrally formed gear and the separately formed cam become a unitary structure.

5. The gear and cam assembly defined by claim 4, in which the interfitting projections and recesses include a conical projection and cavity.

6. The gear and cam assembly defined by claim 4, in which the interfitting projections and recesses include a thickened area and a conical projection on the thickened area for seating in a shallow recess which has a conical cavity communicating with the recess.

No references cited.

FRED C. MATTERN, Jr., *Primary Examiner.*

F. D. SHOEMAKER, *Assistant Examiner.*